March 2, 1965 H. A. MUDD 3,171,470
ELECTRIC CONTROL FOR DIRECT IGNITION OF FUEL BURNERS
Filed March 8, 1962 3 Sheets-Sheet 3

INVENTOR:
HARRY A. MUDD
BY
Sutherland Polster + Taylor
ATTORNEYS.

United States Patent Office 3,171,470
Patented Mar. 2, 1965

3,171,470
ELECTRIC CONTROL FOR DIRECT IGNITION OF FUEL BURNERS
Harry A. Mudd, Clayton, Mo., assignor to McQuay-Norris Manufacturing Company, St. Louis, Mo., a corporation of Delaware
Filed Mar. 8, 1962, Ser. No. 178,311
3 Claims. (Cl. 158—125)

This invention relates to an improved electric control device in a system for direct ignition of fuel burners, and more specifically to an electric control device which operates to energize and de-energize a plurality of circuits in a certain sequence in a timed manner. These circuits in turn perform certain necessary control functions in an ignition cycle whether the burner ignites or fails to ignite. The following explanation and illustrations will be limited to ignition of gas burners, especially those used in all kinds of furnaces. Other various applications of this control device will occur to those skilled in the art.

By way of comparison with what has been done in this field, it may be said that the instant invention is better suited to a wider scope of applications than that claimed in my co-pending application Serial No. 56,284, filed September 15, 1960, for "Direct Ignition For Fuel Burners." In this application for patent is disclosed a system for forced draft applications in which a current of air is heated to relatively low temperatures. In such a system, or application, the gas accumulation might not be at a rate in which the ratio of fuel to air would reach the proportions necessary for an explosive mixture even in the case that the fuel valve remained open for a considerable time after an ignition failure. On the other hand, the instant invention is for a furnace installation and the duration of continued gas flow after ignition failure is critical because gas accumulation would be at a rate normally producing a ratio of gas to air in the range of explosive mixtures.

Electric control of direct ignition for fuel burners is well-known and many of these prior systems have used various temperature, or light sensitive means, as sensing means to control the duration of each cycle. Such means, however, cannot compensate for such variables as power, or fuel pressure, fluctuations, nor compensate for changes in ambient conditions adjacent the burner which can effect, or affect, ignition. These factors directly contribute sometimes to an unsafe condition where a cycle duration is determined by the heating, or cooling, of a sensing means.

It is an object of this invention to provide a control device in a system for direct ignition of a fuel burner which initiates and terminates one or more cycles of events based principally upon elapsed time alone.

It is another object of this invention to provide a control device which will perform these functions wherein the timer for the device is independent of variables, such as power fluctuation, fuel pressure fluctuation, or ambient conditions, which temporarily affect ignition of the burner in the furnace.

Fuel burning systems to which this invention is applicable usually have a fuel burner, a fuel supply under pressure for the fuel burner including either a valve or a suitable pump located to control fuel flow to the fuel burner, an ignition device for the burner, such as a spark plug, a glow plug, or make and break ignition points, and a source of electric power controlled by a room thermostat, or furnace thermostat, connected to energize the fuel supply control and ignition device. With direct ignition, no pilot light, or burner, is required. The control device, according to this invention, is connected between the source of power controlled by the thermostat and the elements in the fuel burning system and provides a plurality of controls in the circuits therebetween operated according to a timed cycle to produce a series of events in timed sequence. In this control, the timed sequence is variable, but when once set becomes fixed as to timed intervals and duration, except in the event of power failure in which case the device "fails safe," that it, it shuts off the burner. Because the control device is in essence a timer which, when once set, merely repeats a timed sequence, it is adaptable to a broad and general usage. Such a control device can be adapted to various environments with but minor adjustment. All that is necessary is to determine by experiment, or by past experience, the safe and proper timing and the duration of the individual events in the cycle. Although this may vary between installations, nevertheless, when once determined, the control device can be set accordingly and thereafter it will repeat the sequence regularly and faithfully.

Other objects and advantages of this invention will appear from the following detailed description which is in such clear, concise and exact terms as will enable any person skilled in the art to make and use the same when taken with the accompanying drawings, forming a part thereof, and in which.

In the following detailed description, the system illustrated includes a burner with a magnetically operated main fuel supply valve, a flame sensing switch, an electric igniter for the burner, a thermostat to indicate when the burner should be operating, and the timed control device. All of these elements with the exception of the latter are well-known in the art, but their interconnection here is believed to be novel.

Figure 1:
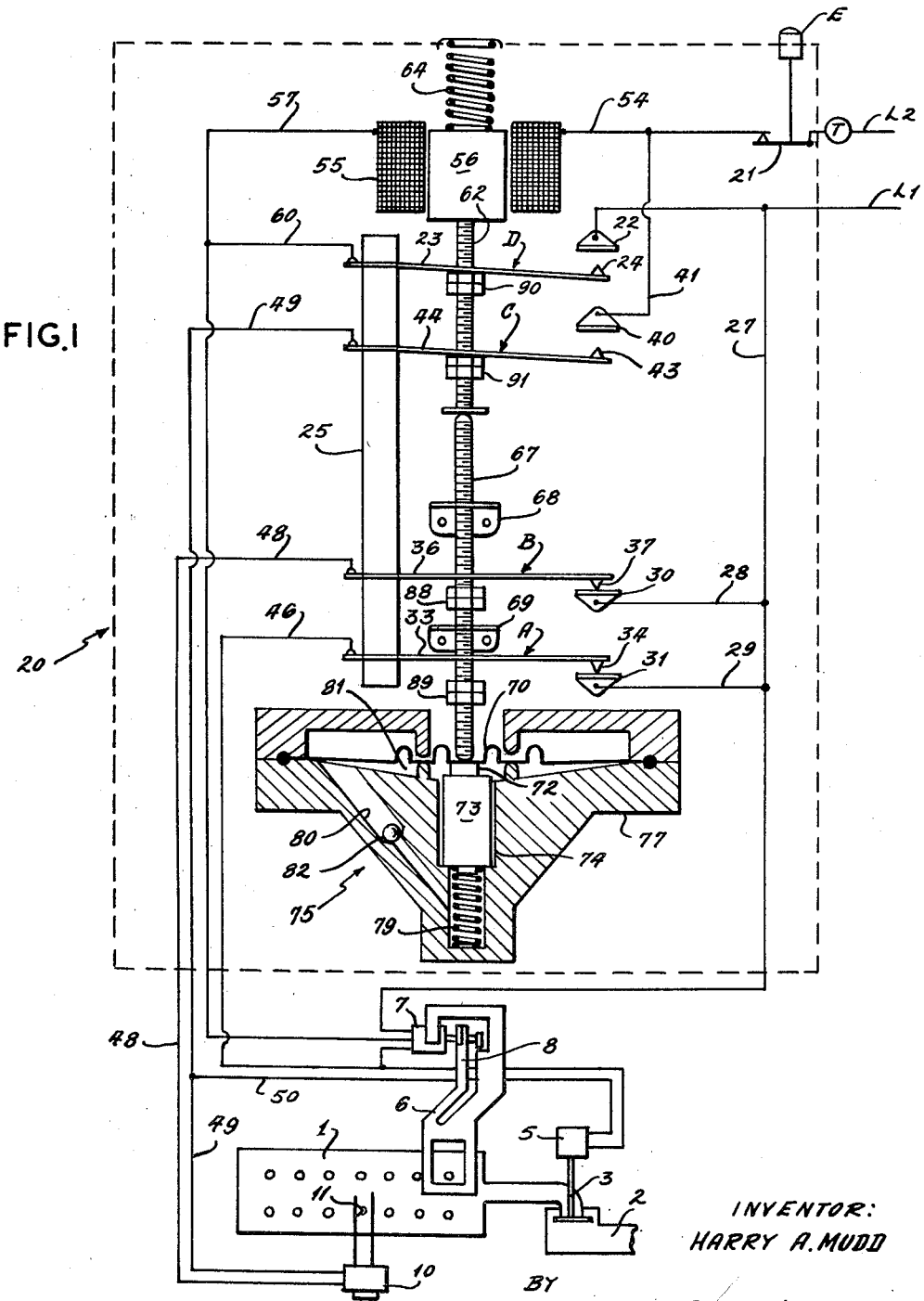
FIG. 1 is a schematic illustration of the control device with parts thereof shown in section together with the electrical hookup with the thermostat and the control elements for direct ignition of a fuel burner.

Turning now to FIG. 1, fuel is supplied to the burner 1 from a fuel main 2 controlled by a valve 3 held closed by a spring, or by gas pressure, and opened by operation of the electric magnet, or solenoid, 5. Element 6 is a flame sensing switch device, such as shown in my prior application Serial No. 149,943, filed November 3, 1961, for "Safety Flame Detector." This flame sensing device has a switch 7. The flame sensing device 6 is shown in its cold position in which the arm 8 thereof has moved into contact with the switch operating button of the switch 7 which connects the circuit between two of the leads extending therefrom. In the hot position, the arm 8 moves to the right and out of contact with the button of the switch 7 thereby completing the circuit between another two of the leads connected with the switch 7.

Disposed in a position over the burner 1 is an igniter device 10 which is a form, preferably like that shown in my aforesaid application in which current is supplied to a pair of make and break points 11 which in turn generate the ignition spark.

The source of power for operating the aforesaid elements is supplied to the control device, generally circumscribed by the dotted outline 20, through a pair of leads L–1 and L–2, preferably the lead L–2 connects with the power source by way of a thermostat which may be responsive to room temperature, or furnace temperature. In the line L–2 is a normally closed switch 21 which can be manually operated to open by a push button E mounted in the side of the box enclosing the control device. The function of this switch will be hereinafter explained.

Line L–1 connects directly with the fixed contact 22 of a switch, indicated as D, having a leaf, spring-like movable arm 23 mounting the moving contact 24 in an insulated holder 25 mounted on the back wall of the box containing the control device 20. Line L–1 has a branch 27 which extends directly to one terminal connection on a flame sensing switch 7. From the branch 27 are two leads 28 and 29 connecting directly with fixed contacts 30 and 31 of switches B and A, respectively. Switch A has a leaf spring arm 33 mounting its movable contact 34 on the fixed holder 25 of insulating material. Switch B has a leaf spring arm 36 mounting its movable contact 37 on the fixed holder 25. Both switches are normally closed.

Switch C has a fixed contact 40 connected with a lead 41 extending to the line L–2. The movable contact 43 of the switch C is mounted on a flexible leaf spring arm 44 also supported by the holder 25. As will be seen, the two switches C and D are normally open, while switches A and B are normally closed. This is in the inactive position of the switch elements in which the controlled elements are deenergized.

Each of these switches A, B, C and D are suitably connected with the controlled elements in the following manner. Switch A is connected by lead 46 with one terminal on the flame sensing switch 7 and with one terminal on the solenoid 5. Switch B is connected by a lead 48 with one terminal on the igniter 10. The other terminal on the igniter 10 is connected by a lead 49 with the switch C. There is a branch lead 50 from the lead 49 which extends to one of the terminals on the solenoid 5. From the switch 21, a lead 54 connects directly to the field coil 55 of a solenoid 56. A second lead 57 connects directly with the other terminal in the field coil of the solenoid 56 and directly with a terminal on the flame sensing switch 7. An auxiliary holding circuit for the solenoid 56 has a lead 60 connected with the switch D.

The switches A, B, C and D have an operating means for mechanically opening and closing the same, and this mechanical means includes a threaded rod 62 fixed within the movable armature of solenoid 56. Both armature and rod are forced downwardly by a compression spring 64 bearing against the armature in the armature 56 of solenoid 55 on one end and seated at its other end within a cup formed in the upper wall of the cabinet enclosing the control device. On the end of the rod 62 is a flat head, or the like, 65 which bears directly against the end of a threaded rod 67 guided within brackets 68 and 69 fixed to the back wall of the cabinet enclosing the control device.

Rod 67 in turn bears at its opposite end upon one side of a diaphragm type seal 70 of a dash pot, generally indicated as 75. The opposite side of the diaphragm, opposite the end of the rod 67 is supported by a stem 72 of dash pot piston 73. This piston reciprocates within a cylinder 74 within the exterior housing 77 of dash pot 75. Below the cylinder 74 and within the outer casing 77 is a spring seat containing a coil compression spring 79 which is considerably weaker than the aforementioned spring 64. There is a passage 80 extending from the bottom of the cylinder 74 to a storage chamber 81 located immediately adjacent the diaphragm seal 70. This passage is controlled by a ball check valve 82, and the storage chamber, spring seat, and cylinder 74 beneath the piston 73, is filled with silicon gauge fluid which has the characteristic of constant viscosity over an extremely wide range of temperatures. Thus, the dash pot 75 forms a temperature compensated timer in which, when the piston 73 is forced downwardly, fluid beneath the piston readily escapes past the check valve 82 to the storage chamber 81. When solenoid 56 is energized compressing spring 64 and moving head 65 out of the way, then spring 79 is free to expand against the resistance of piston 73 which will move upwardly under influence of the spring 79 at a rate permitted by leakage of the dash pot fluid past the check valve 82.

As the piston 73 moves upwardly at a timed rate, it moves the rod 67. On this rod are adjustable nuts 88 and 89 which can be positioned on the threads a given distance spaced from the movable arms 33 and 36. Because of this arrangement, it is possible to set the nuts 88 and 89 to sequentially open the switches B and A. In the preferred setting, the switch B is opened approximately five seconds after the piston 73 starts its upward movement. The nut 89 is set so that approximately fifteen to thirty seconds after the piston 73 starts its upward movement switch A is opened.

On the rod 62 are similar nuts 90 and 91. These are properly positioned so that when the solenoid 56 is energized, both switches C and D will close.

*Operation*

In the position and condition of the parts shown in FIG. 1, the burner is inoperative and the valve 3 is closed. This condition will pertain so long as no heat is called for from the burner by the thermostat. When the thermostat closes, however, energizing the lines L–1 and L–2, a circuit will be established from the line L–2 through lead 54, solenoid coil 55, lead 57 to the center connection on the flame sensing switch 7. Since the sensing switch is cold, a connection is made directly with lead 27 completing the circuit back to L–1. Thus, closing of the thermostat immediately energizes the solenoid 56 compressing the spring 64 and withdrawing the head 65 from contact with the rod 67. Simultaneously, several things will happen. Switches C and D immediately close. The closing of the switch C completes a circuit from the line L–1 through the lead 29 and switch A to lead 46 connected with one terminal of the solenoid motor 5 operating the valve 3. The other terminal of the same solenoid valve is connected through the lead 50 to the lead 49 and then through the switch C when it closes to lead 41 and line L–2. Solenoid 5 will be energized opening the gas valve 3 and allowing gas to flow from the main 2 to the burner 1. At the same time, the switch B being also closed will complete the circuit from the line L–1 through leads 27, 28 to lead 48 and thence to the igniter 10. A lead 49 connecting to the other terminal of the igniter 10 is in turn connected through the closed switch C with lead 41 and line L–2. Thus, simultaneously with the closing of the switch C, the gas valve is opened and the igniter begins operation.

As mentioned above, the switch D also closes and this in turn closes a holding circuit through leads 60, switch D to leads L–1 and L–2 through the solenoid 56. Consequently, at the beginning of operation of the control device 20, both gas valve and igniter are operating simultaneously, and the head 65 has been withdrawn from the rod 67 so that the dash pot 75 begins to operate piston 73 to move upwardly moving the rod 67 with it. Assuming the nut 88 to be adjusted in the proper position, then five seconds after the beginning of operation, switch B is opened. This deenergizes the igniter 10 five seconds after it starts to operate and five seconds after gas starts to flow to the burner 1. This is generally a sufficient time by a fair margin for the burner 1 to light. If it does not light within this time, further operation of the igniter 10 is definitely unsafe because an explosive mixture is being rapidly formed within the furnace which, if subsequently ignited by continued operation of the igniter 10, might do serious damage. Consequently, it can be said that under normal conditions burner 1 will light within the five second interval after gas is turned on and igniter 10 starts to operate. Under normal conditions, therefore, burner 1 will light practically immediately and this in turn will start the heating of flame sensing switch 6. Within fifteen seconds after burner 1 lights, flame sensing switch 6 has reacted opening the circuit between lead 57 which connects with line L–2 and lead 27 which connects with line L–1. Solenoid 56, however, will not be de-energized by this action since holding switch D is closed. At the same time that the switch 7 is opening one circuit, it is closing the circuit between the lead 57 and the lead 46 so as to complete the circuit from the line L–1 through the lead 57 to switch 7 and through the lead 46 to solenoid 5. As rod 67 continues to move upwardly, approximately thirty seconds later, nut 89 will open switch A, but, although this would normally deenergize solenoid 5 shutting off the gas as just stated, a second circuit has been completed through the flame sensing switch 7 from L–1, switch D, leads 60 and 57 to the solenoid 5 to leads 50, 49, and switch C to L–2 so that this solenoid remains energized even though switch A opens.

This completes the cycle for the run condition in which the control device 20 is now in a condition in which both switches A and B are opened and both switches C and D are closed. This condition will continue so long as the burner 1 stays lighted. If, however, gas pressure fails and the burner 1 goes out, flame sensing switch 6 thereafter reacts opening the circuit between the lead 57 and solenoid 5 of the gas valve 3 closing the valve and shutting off the burner against the possibility that gas pressure comes on again and the burner is not lighted.

Under nomal conditions, however, burner 1 will continue to operate until the thermostat controlling the power to the lines L–1 and L–2 disconnects the circuit from the power source to the control device 20. Any interruption in the power supply through the lines L–1 and L–2 will perform the same function as the thermostat. In any case, the interruption of power in either line L–1 or L–2 shuts off the gas valve 3, de-energizes the solenoid 56 and the parts returned to the original position shown in FIG. 1. Now, if power supply is restored through the lines L–1 and L–2, flame sensing switch 6 is still in the hot position so that lead 57 remains disconnected from the lead 27 and initiation of the cycle is prevented so long as the switch 7 stays in the hot position. As an added safety feature, therefore, it would be possible to install a gas pressure responsive device in the main 2 which interrupted the power supply through the line L–1 for example. The effect upon the system which such an added feature would have would be exactly as that described as a result of power failure.

Not only is the control device capable of failing safe on the interruption of gas supply, or of power supply, but it is likewise arranged to fail safe in case ignition does not occur. Thus, take a situation in which the thermostat closes the circuit supplying power to the lines L–1 and L–2, the control device responds as above described, but ignition does not occur. Because of the failure of ignition, flame switch 7 will not close the circuit between lead 57 and lead 46. Thus, within thirty seconds after initiation of the control cycle, switch A will open de-energizing the line 46 to the solenoid 5 of the main valve 3, and main valve 3 will close shutting off the gas supply and thus the system fails safe. This safe condition of the system will prevail so long as lines L–1 and L–2 remain energized. Presumably, this condition will continue so long as the thermostat demands heat, and, consequently, the control device 20 remains in the fail safe position. In order to avoid a service call whenever this condition prevails through no fault in the function of the control device, or control elements, the control device is provided with an emergency button E. Operation and release of the button E will break the circuit to the control device 20 and then re-establish that circuit provided, of course, the thermostat is closed supplying power to the lines L–1 and L–2. Making and breaking the circuit through the button E will cause the control device 20 to recycle, and, provided that there is no apparent reason why there was an ignition failure in the first place, the repetition in the cycle causes ignition.

Figure 2:
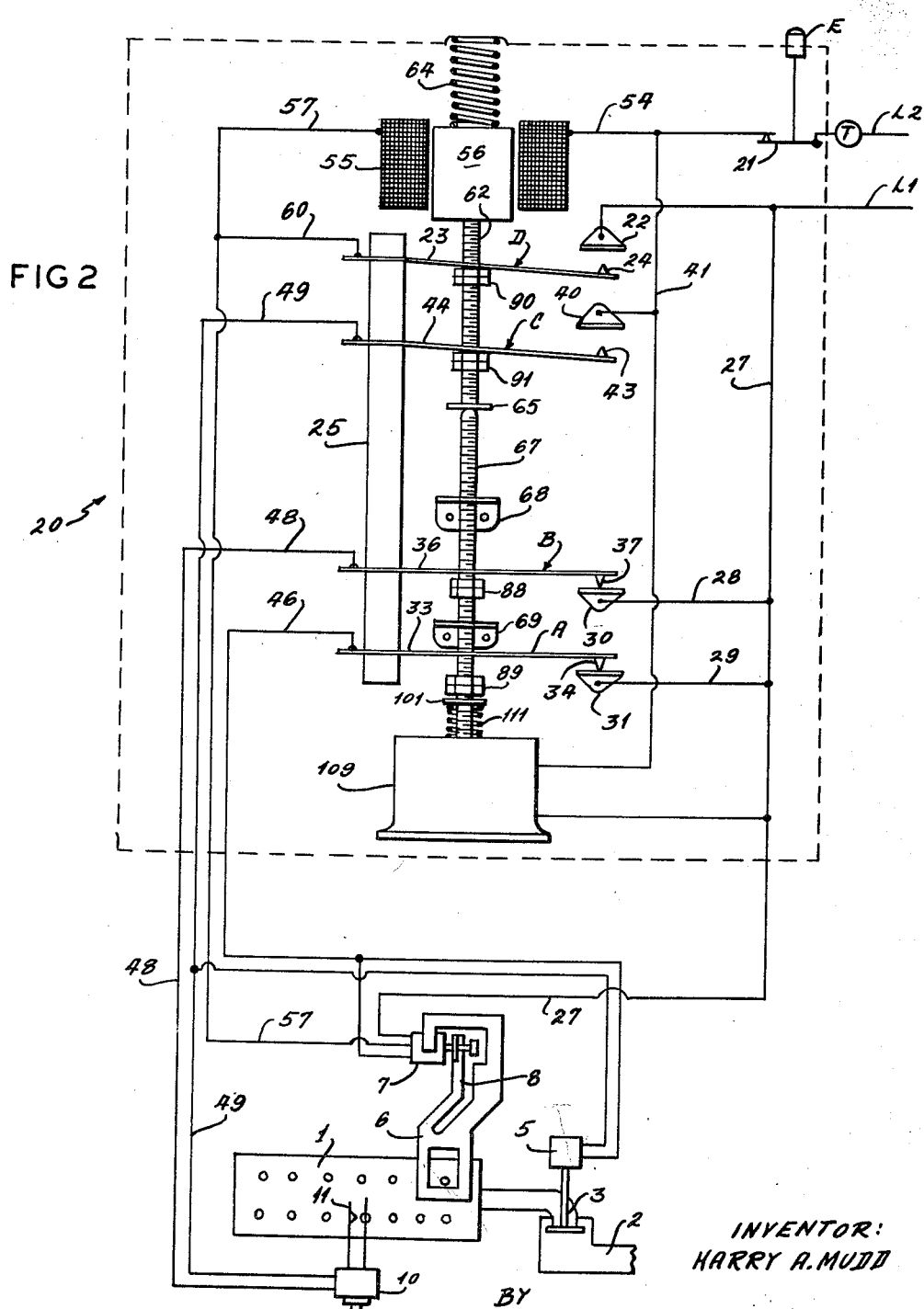
FIG. 2 is a view similar to FIG. 1 showing a modified form of the control device and its hookup to the control elements in a direct ignition system for fuel burners.
Figure 3:
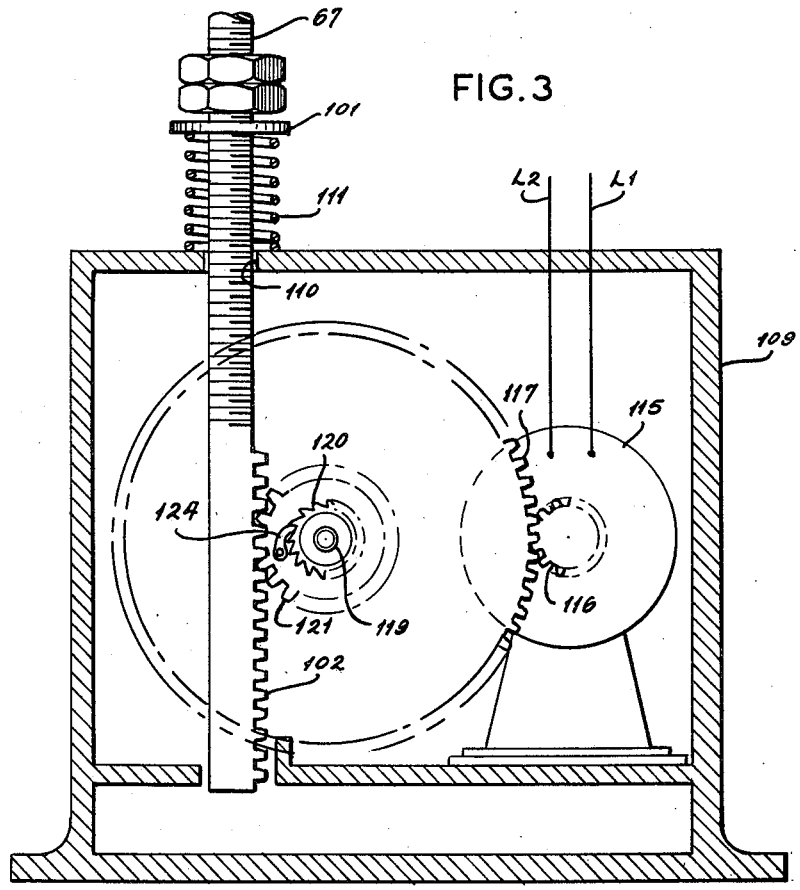
FIG. 3 is a schematic illustration with parts shown in section illustrating a modified form of timer which can be used in the control devices shown in FIGS. 1 and 2.
Figure 4:
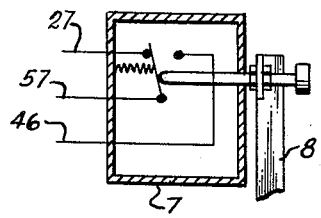
FIG. 4 is a schematic diagram showing the position of a flame-sensor-actuated switch (utilized in the present invention) under circumstances of no flame, i.e., cold.
Figure 5:
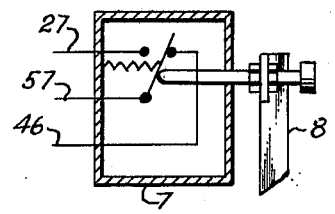
FIG. 5 is a schematic diagram showing the position of the switch shown in FIGURE 4 under circumstances of enduring flame, i.e., hot.

Whereas the timer used in the modification shown in FIG. 1 is a dash pot with a constant viscosity liquid, it is possible to use other mechanisms which are equally satisfactory. One example of such a mechanism is shown in FIG. 2 schematically. Referring specifically to FIG. 3, the rod 67 has an integral flange 101 and a lower portion formed with rack teeth 102. The lower end of the rod 67 projects within a casing 109 through an aperture therein 110. Resting on the top of the casing and compressed by the flange 101 is a compression spring 111. Within the casing 109 is a clock motor 115 of the shaded pole type with a driving gear 116. This gear in turn meshes with a large gear 117 of a speed reduction mechanism. The output shaft 119 of a speed reduction mechanism driven by the clock motor 115 carries a ratchet gear 120 fixed thereto and rotatable at very slow speed by the shaft 119. Also mounted on the shaft 119 is a freely rotatable gear with teeth 121 meshing with the rack teeth 102. Gear 121 carries a pall 124 biased in the direction of the ratchet 120. The direction of rotation of the motor 115 is such that the shaft 119 is rotated in a clockwise direction as viewed in FIG. 2. The motor 115 is energized from the lines L–1 and L–2 so that it is supplied with power continuously during the operation of the control device 20. Ratchet connection 120 and 124 is such as to allow the shaft 119 to continue its rotation whether or not the rod 66 is moving or stationary, but, if the rod 67 is moving upwardly in response to urging of the spring 111, its movement will be no faster than permitted by gear 121. In other words, gear 121 cannot be rotated faster in a clockwise direction than the shaft 119 whose speed in turn is controlled by rotation of the speed reducing gearing by the motor 115. Thus, if the proper gear reduction is selected, movement of the rod 67 in an upward direction will be at the same rate to produce the same results as the dash pot 75. In all respects, the modification shown in FIG. 2 will operate as described with respect to the modification in FIG. 1.

Changes in and modifications of the construction described may be made without departing from the spirit of my invention or sacrificing its advantages.

Having thus described the invention, what is claimed and desired to be secured by Letters Patent is:

1. In a control circuit for a fluid fuel burner having an electrically operable valve for controlling the flow of fuel to the burner, an electrically operable igniter arranged in the path of fuel emerging from the burner, and a flame sensor having a thermo-responsive part exposed to flame at said burner, circuit means including a solenoid-operated switch having an energized position to initiate the flow of current to said igniter and to said valve, switch means operated by said flame sensor and arranged and connected to alternately:

(a) complete a circuit through the solenoid of said solenoid-operated switch when said thermo-responsive part is cold and the contacts of said solenoid-operated switch are open;

(b) complete a circuit to said electrically operated valve to maintain said valve open while said thermo-responsive part is hot and the solenoid of said solenoid-operated switch is energized;

and said circuit means including an initially closed time limited switch, independent of said flame-sensor-operated switch means, for completing, for a limited time period after energization of the solenoid of said solenoid-operated switch, the circuit to said valve and ultimately, after the expiration of said limited time period, interrupting the flow of current to said valve unless said flame-sensor-operated switch has assumed the position defined in (b).

2. In a control circuit for a fluid fuel burner having an electrically operable valve for controlling the flow of fuel to the burner, an electrically operable igniter arranged in the path of fuel emerging from the burner, and a flame sensor having a thermo-responsive part exposed to flame at said burner, circuit means including a solenoid-operated switch having an energized position to initiate the flow of current to said igniter and to said valve, switch means operated by said flame sensor and arranged and connected to alternately:

(a) complete a circuit through the solenoid of said solenoid-operated switch when said thermo-responsive part is cold and the contacts of said solenoid-operated switch are open;

(b) complete a circuit to said electrically operated valve to maintain said valve open while said thermo-responsive part is hot and the solenoid of said solenoid-operated switch is energized;

and said circuit means including:

(c) an initially closed time limited switch, independent of said flame-sensor-operated switch means, for completing, for a limited time period after energization of the solenoid of said solenoid-operated switch, the circuit to said valve and ultimately, after the expiration of said limited time period, interrupting the flow of current to said valve unless said flame-sensor-operated switch has assumed the position defined in (b); and (d) an initially closed time limited switch independent of said flame-sensor-operated switch means for de-energizing said igniter a time period after the energization of the solenoid of said solenoid-operated switch.

3. In a control circuit for a fluid fuel burner having an electrically operable valve for controlling the flow of fuel to the burner, an electrically operable igniter arranged in the path of fuel emerging from the burner, and a flame sensor having a thermo-responsive part exposed to flame at said burner, circuit means including a solenoid-operated switch having an energized position to initiate the flow of current to said igniter and to said valve, switch means operated by said flame sensor and arranged and connected to alternately:

(a) complete a circuit through the solenoid of said solenoid-operated switch when said thermo-responsive part is cold and the contacts of said solenoid-operated switch are open;

(b) complete a circuit to said electrically operated valve to maintain said valve open while said thermo-responsive part is hot and the solenoid of said solenoid-operated switch is energized;

and said circuit means including:

(c) an initially closed time limited switch, independent of said flame-sensor-operated switch means, for completing, for a limited time period after energization of the solenoid of said solenoid-operated switch, the circuit to said valve and ultimately, after the expiration of said limited time period, interrupting the flow of current to said valve unless said flame-sensor-operated switch has assumed the position defined in (b); and (d) an initially closed time limited switch independent of said flame-sensor-operated switch means for de-energizing said igniter a time period after the energization of the solenoid of said solenoid-operated switch;

said initially closed time limited switches ((c) and (d)) being mounted for movement between closed and open positions, and a rectilinearly movable actuator for moving said time limited switches, said actuator being (e) movable independently of said solenoid-operated switch when the latter is closed and (f) movable by said solenoid-operated switch when the latter is moving from closed to open position; means constantly biasing the movement of said actuator toward a position whereat said initially closed switches are opened, and means retarding the biased movement of said actuator into the last-mentioned position for a time period greater than that required after energization of the solenoid of said solenoid-operated switch for said flame-sensor-actuated switch to move from the position defined in (a) to the position defined in (b).

References Cited by the Examiner

UNITED STATES PATENTS

| | | | |
|---|---|---|---|
| 1,320,936 | 11/19 | Scott | 158—28 |
| 1,660,959 | 2/28 | Goodhue et al. | 158—28 |
| 1,958,093 | 5/34 | Miller | 158—28 |
| 2,135,829 | 11/38 | McGoldrick | 158—28 |
| 2,618,323 | 11/52 | Aubert | 158—28 |
| 2,640,648 | 6/53 | Judson | 158—28 |
| 2,657,743 | 11/53 | Aubert | 158—28 |
| 2,851,095 | 9/58 | Aubert | 158—123 |

JAMES W. WESTHAVER, Primary Examiner.

PERCY L. PATRICK, Examiner.